Figure 1:
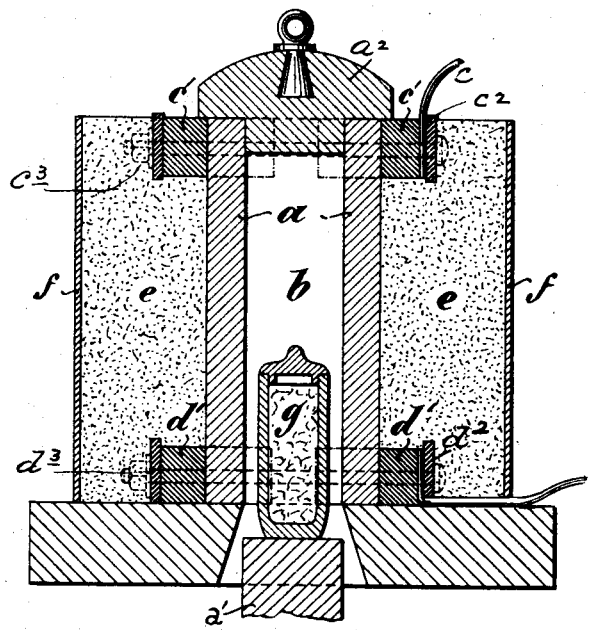

No. 684,296. Patented Oct. 8, 1901.
W. NERNST & L. GLASER.
ELECTRIC FURNACE.
(Application filed July 6, 1900.)

(No Model.) 2 Sheets—Sheet 1.

No. 684,296. Patented Oct. 8, 1901.
W. NERNST & L. GLASER.
ELECTRIC FURNACE.
(Application filed July 6, 1900.)

(No Model.) 2 Sheets—Sheet 2.

UNITED STATES PATENT OFFICE.

WALTHER NERNST, OF GÖTTINGEN, AND LUDWIG GLASER, OF COBURG, GERMANY.

ELECTRIC FURNACE.

SPECIFICATION forming part of Letters Patent No. 684,296, dated October 8, 1901.

Application filed July 6, 1900. Serial No. 22,724. (No model.)

*To all whom it may concern:*

Be it known that we, WALTHER NERNST, professor and doctor of philosophy, a subject of the King of Prussia, Emperor of Germany, and a resident at No. 50 Bürgerstrasse, Göttingen, Prussia, and LUDWIG GLASER, doctor of philosophy, a subject of the Duke of Saxe-Coburg, and a resident at 6 Badergasse, Coburg, Duchy of Saxe-Coburg, German Empire, have invented a new and useful Electric Furnace, of which the following is a specification.

The present invention relates to that class of electric furnaces which are constructed with walls that are wholly or partly composed of solid electrical conductors of the second class, or so-called "dry" electrolytes, serving as electrical resistance to transform the electric current into heat; and it has for its object to render said furnaces more adapted for practical use than heretofore.

To this end the present invention consists in certain improvements in the composition and construction of the dry electrolyte, the electric connection between the latter and the current-supply, and the preheating arrangement.

It is well known that dry electrolytes do not become electrically conductive without being first heated to a high temperature by means of any source of heat, but that once rendered conductive or "excited" they are caused to remain incandescent by the passage of the current, so that then the preheating device can be dispensed with.

A material especially adapted for use as the dry electrolyte would be magnesia were it not that pure magnesia retains its extremely great electrical resistance up to very high temperatures. According to this invention this inconvenience is done away with—that is to say, the electrical resistance of the magnesia electrolyte is reduced to a more practical lower degree by the admixture with the magnesia of a small percentage of lime, (preferably in the form of calcium carbonate,) alumina, silica, kaolin, and the like, whereby the resistance can be reduced without injuring such other qualities of the magnesia as make it especially fit for the purpose in view. Thus we obtain a composite dry electrolyte which meets the practical requirements as to cheapness, durability, and efficiency. For many purposes—for instance, when treating substances capable of reacting with the lime or other admixed component—we prefer to provide the said composite electrolyte with an inner lining composed of pure magnesia, and when using such lining we prefer to provide the same on one or both of its sides with a fine layer of graphite to give it some initial conductivity.

The electric connection between the dry electrolyte and the conductor supplying it with current is subject to rapid wear when provided for in the usual manner—that is to say, by directly connecting the conductor and the dry electrolyte. According to this invention said connection is established by means of intermediate connecting pieces or electrodes, which are composed of such metallic oxids as have the property of being to some extent electrically conductive at ordinary temperature. As such oxid ferric oxid has proved to be best adapted, as it is capable of withstanding high temperatures. In this way we secure the advantage that the fittings require but little or no preliminary heating.

To start the improved furnace—that is to say, to impart conductivity to the dry electrolyte—any preheating arrangement may be used. For instance, electrical resistances made out of carbon or platinum or the like may be used, or we may coat the surface of the dry electrolyte with a thin layer of a conductor of the first class that burns away when the dry electrolyte has become excited—such as powdered carbon, silicon, and the like—or we may effect the preheating by means of a flame, preferably produced inside the furnace by burning coal-gas or solid combustibles preferably mixed with substances yielding oxygen, such as nitrates and the like. In general, however, we prefer to operate the preheating by means of a rod-shaped electrical resistance composed of a conductor of the first class, preferably a carbon rod, which is introduced inside the furnace and withdrawn after the latter has become sufficiently hot to conduct the electrical current.

With the improved furnace we in general prefer to supply the same with alternating currents. In cases, however, where it is required to use a composite magnesia electrolyte having large dimensions a continuous current may be applied.

In the accompanying drawings is illustrated a tubular or cylindrical furnace provided with our improvements.

Figure 2:
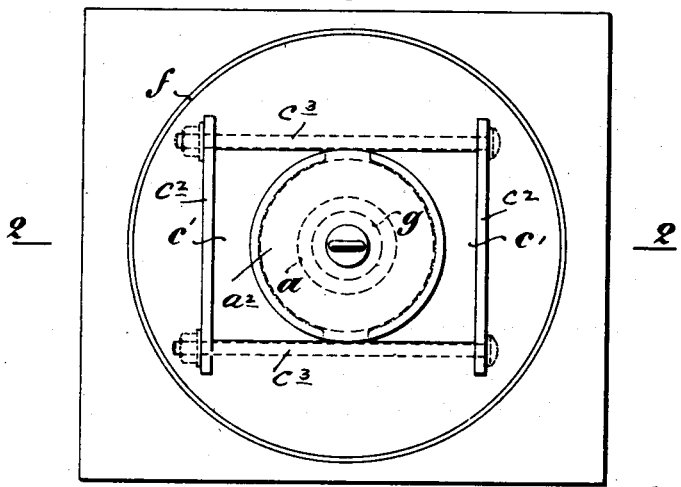
Figure 3:
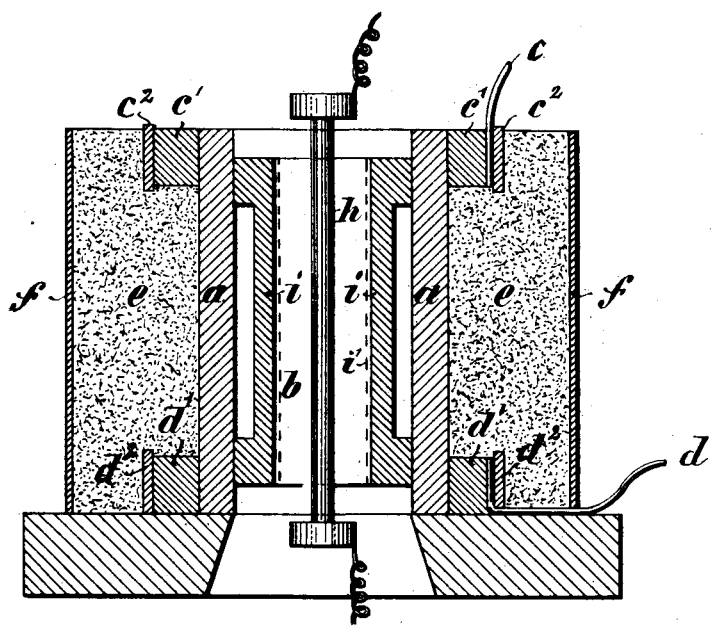

Figure 1 is a vertical central section of the furnace on line 2 2, Fig. 2; and Fig. 2 is a plan view of the same. Fig. 3 is a vertical central section of a furnace in which the composite dry electrolyte is provided with an inner lining of pure magnesia, this figure showing, moreover, the removable electric preheater consisting of a carbon-rod.

$a$ is the dry electrolyte, composed of magnesia and calcium carbonate, for instance, and having the shape of a tube or hollow cylinder, the internal space of which constitutes the working chamber $b$.

$c$ and $d$ are the supply conductors, the connection of which with the cylinder $a$ is established by interposing masses of ferric oxid $c'$ $d'$, pressed against the cylinder by means of iron plates $c^2$ $d^2$ and screw-bolts $c^3$ $d^3$, so as to secure intimate contact. The cylinder $a$ is surrounded by a suitable non-conductor of heat $e$—such as loose magnesia, calcium oxid, aluminium oxid, and the like—inclosed in a casing or jacket $f$. The cylinder $a$ is open at the top and provided with a removable bottom $a'$.

In order to excite the furnace, a carbon-rod $h$, Fig. 3, is inserted in the cylinder $a$ through its open top and bottom, preferably through the top, and a strong electric current caused to pass through the rod until the inner side of cylinder or tube $a$ has been heated by the heat radiating from the rod $h$ to such a degree as to manifest a sufficient degree of initial conductivity. When this point has been reached the current is cut off from the rod $h$, the latter is withdrawn, and the chamber $b$ is charged with the material to be treated, which, for instance, may be contained in a crucible $g$, placed upon the removable bottom $a'$, which is elevated, so as to close the chamber $b$ from below. The furnace may be left open at the top, but is preferably closed by means of a lid $a^2$ in order to avoid loss of heat.

In Fig. 3 the furnace is provided with an inner lining $i$, composed of pure magnesia. This lining is preferably made in the form of a separate tube or hollow cylinder, preferably provided with an outer flange at both ends, so that it can be withdrawn from the furnace. This modification of the furnace is intended to be used when the materials to be treated are not contained in a crucible, especially when said materials are to be passed through the working chamber in a continuous current. When using the lining $i$, we prefer to provide the same on one or both of its sides with a fine layer or film of graphite to give it some initial conductivity. In the figure this film of graphite is represented by the dotted line $i'$.

We claim—

1. In an electric furnace comprising a working chamber constructed with a dry electrolyte to develop heat by the agency of its resistance to the electric current, conductors for supplying the chambers with current and preheating means for exciting it, the combination with the chamber, the conductors and preheating means of intermediary conductors composed of such metallic oxids as manifest some electrical conductivity at the ordinary temperature and placed between the chamber and the supply-conductors in intimate contact therewith, substantially as and for the purpose stated.

2. In an electric furnace comprising a working chamber constructed with a dry electrolyte to develop heat by the agency of its resistance to the electric current, conductors for supplying said chamber with current, and preheating means for exciting it, the combination with the supply-conductors and preheating means, of a chamber composed of a mixture of magnesia and other dry electrolytes, and an inner magnesia lining for the same, substantially as and for the purpose stated.

3. In an electric furnace comprising a working chamber constructed with a dry electrolyte to develop heat by the agency of its resistance to the electric current, conductors for supplying said chamber with current, and preheating means for exciting it, the combination with the chamber and its supply-conductors of a removable rod composed of a conductor of the first class and electrical connections for the same, substantially as and for the purpose stated.

4. In an electric furnace, a working chamber constructed with a mixture of magnesia and calcium carbonate, a lining for the same consisting of pure magnesia, supply-conductors, intermediate conductors composed of ferric oxid arranged in intimate contact with the chamber and the supply-conductors, preheating means consisting of a removable carbon-rod and electrical connection for the same, substantially as and for the purpose stated.

In testimony whereof we have hereunto set our hands in presence of two subscribing witnesses.

WALTHER NERNST.
LUDWIG GLASER.

Witnesses to signature of Walther Nernst:
L. FRETTE,
MICHEL H. DREGE.

Witnesses to signature of Ludwig Glaser:
ERNEST GUMPERT,
FRIEDRICH HAAS.